United States Patent
Rhea et al.

(10) Patent No.: US 8,418,312 B2
(45) Date of Patent: Apr. 16, 2013

(54) EASY ACCESS FILTER ASSEMBLY FOR A WET/DRY VACUUM APPLIANCE

(75) Inventors: Steven Rhea, St. Peters, MO (US); Douglas Schultz, Glen Carbon, IL (US)

(73) Assignee: Emerson Electric Co., St. Louis, MO (US)

( * ) Notice: Subject to any disclaimer, the term of this patent is extended or adjusted under 35 U.S.C. 154(b) by 683 days.

(21) Appl. No.: 12/414,628

(22) Filed: Mar. 30, 2009

(65) Prior Publication Data

US 2009/0265882 A1    Oct. 29, 2009

Related U.S. Application Data

(60) Provisional application No. 61/040,362, filed on Mar. 28, 2008.

(51) Int. Cl.
*A47L 9/00* (2006.01)
*A47L 5/00* (2006.01)
*A47L 7/00* (2006.01)

(52) U.S. Cl.
USPC .............................. 15/330; 15/320; 15/327.2

(58) Field of Classification Search .................... 15/320, 15/327.2, 330
See application file for complete search history.

(56) References Cited

U.S. PATENT DOCUMENTS

| | | | |
|---|---|---|---|
| 4,501,378 A | 2/1985 | Berfield | |
| 4,825,502 A | 5/1989 | Armstrong et al. | |
| 4,880,364 A * | 11/1989 | Berfield et al. | 417/423.1 |
| 5,548,868 A | 8/1996 | Berfield | |
| 5,606,769 A * | 3/1997 | Tomasiak et al. | 15/327.6 |
| 5,611,107 A | 3/1997 | Tomasiak et al. | |
| 5,935,279 A | 8/1999 | Kilstrom | |
| 6,055,700 A | 5/2000 | Holsten et al. | |
| D438,353 S | 2/2001 | Hoshino et al. | |
| D446,892 S | 8/2001 | Griffin | |
| D447,292 S | 8/2001 | Griffin | |
| D447,293 S | 8/2001 | Griffin | |
| D447,842 S | 9/2001 | Griffin | |
| D447,843 S | 9/2001 | Griffin | |
| D452,052 S | 12/2001 | Griffin | |
| D454,672 S | 3/2002 | Griffin | |
| 6,391,095 B1 | 5/2002 | Conrad et al. | |
| D461,605 S | 8/2002 | Griffin | |
| 6,484,351 B2 | 11/2002 | Griffin et al. | |
| D469,934 S | 2/2003 | Fry et al. | |
| D470,279 S | 2/2003 | Griffin et al. | |

(Continued)

*Primary Examiner* — Bryan R Muller
(74) *Attorney, Agent, or Firm* — Sutton McAughan Deaver, PLLC; Craig E. Walter (57) ABSTRACT

Described herein are improved wet/dry vacuum appliance assemblies and associated systems which facilitate the ease of removal of the filter assembly from within the appliance itself. The vacuum appliance assemblies described include a drum, a lid assembly adapted to removably mount on or to hinge on the drum, and a filter assembly housed within the lid assembly, wherein the lid assembly comprises a removable component such that if the removable component is removed, the filter assembly is accessible. Also described herein are methods of removing such a filter assembly from a wet/dry vacuum appliance, wherein the method includes removing a component of the lid assembly of the wet/dry vacuum in order to make the filter assembly accessible, grasping a handle of a filter assembly housed within the lid assembly of the wet/dry vacuum appliance, rotating the filter assembly so as to disengage it from a sealing relationship with the lower portion of an interior region of the lid assembly, and then removing the filter assembly from the vacuum appliance by pulling generally in an upward direction.

14 Claims, 8 Drawing Sheets

U.S. PATENT DOCUMENTS

| | | |
|---|---|---|
| 6,736,873 B2 | 5/2004 | Conrad et al. |
| 6,746,059 B2 | 6/2004 | Thomas |
| D492,824 S | 7/2004 | Tomasiak et al. |
| 6,902,596 B2 | 6/2005 | Conrad et al. |
| D507,386 S | 7/2005 | Griffin et al. |
| 7,014,675 B2 | 3/2006 | Nakai et al. |
| D519,251 S | 4/2006 | Hoshino et al. |
| 7,287,301 B2 | 10/2007 | Marshall et al. |
| 7,419,522 B2 | 9/2008 | Arnold |
| 7,455,708 B2 | 11/2008 | Conrad et al. |
| 7,604,675 B2 | 10/2009 | Makarov et al. |
| 7,655,060 B2 | 2/2010 | Nakai et al. |
| D614,369 S | 4/2010 | Theising et al. |
| D615,259 S | 5/2010 | Theising et al. |
| D619,770 S | 7/2010 | Moore, Jr. et al. |
| 2003/0167590 A1* | 9/2003 | Oh .................................. 15/347 |

* cited by examiner

EASY ACCESS FILTER ASSEMBLY FOR A WET/DRY VACUUM APPLIANCE

CROSS REFERENCE TO RELATED APPLICATIONS

The present application claims priority to U.S. Provisional Patent Application Ser. No. 61/040,362, filed Mar. 28, 2008, the contents of which are incorporated herein by reference in its entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention. The inventions disclosed and taught herein relate generally to wet/dry vacuum appliances, and more specifically, are related to easy access filter assemblies for use in association with wet/dry vacuum appliances.

Description of the Related Art. Vacuum appliances capable of picking up both wet and dry material, such as wet/dry vacuums, are often used in workshops, basements, and other environments where both wet and dry debris can accumulate. Wet/dry vacuum appliances conventionally consist of a collection canister or drum, typically mounted either on a dolly having wheels or casters, and a lid assembly which includes a power head within which a motor and impeller assembly is mounted. The motor and impeller assembly creates suction within the drum, such that debris and/or liquid are drawn into the drum through a flexible hose or the like attached to an air inlet. A filter within the drum prevents incoming solid debris from escaping from the drum while allowing filtered air to escape back into the surrounding environment. Any liquid drawn into the drum is typically diffused and accumulates on the bottom of the drum.

In typical operation, a user may desire to replace or clean the vacuum filter after extended periods of operation, or after specific uses (such as drywall dust collection), in order to maintain optimal vacuum efficiency. In a typical operation, the user would first remove the power head and the entire lid assembly by unlatching the lid assembly and removing it from the tub, thereby exposing the filter assembly. The user could then remove the filter assembly and either clean or replace the filter. Re-assembly would then be the reverse of this process. However, this method and system design can lead to several potential issues.

First, the user will often have to work one or more latches and then remove the heavy power head of the vacuum, which can become heavier depending upon the degree of solid debris contained on or within the filter itself. Additionally, known wet/dry vacuum cleaners with hingable lid assemblies can potentially tip over, for example, or shift unexpectedly in location as the lid is hinged open, resulting in the vacuum cleaner tipping over due to uneven weight displacement. Third, while balancing the lid on the drum to keep the lid open during a filter change, the liquid or solid debris that has been collected by the wet/dry vacuum may be released into the environment. In sum, to replace the filter, a user may often have to work two latches, remove the heavy power head, open the lid, and while balancing the lid on the drum to keep the debris from dispersing into the surrounding environment in an unwanted manner, the user would have to remove filter plate and/or the filter cage stem nut in order to get the filter assembly off of the motor head or vacuum lid, whereafter the user must then dispose of the filter assembly or clean the filter itself appropriately. The present disclosure addresses these shortcomings associated with prior vacuum appliance system designs.

The inventions disclosed and taught herein are directed to improved systems and methods for accessing and/or replacing a filter of a wet/dry vacuum appliance, as well as improved vacuum appliance filter assembies suitable for easy removal from the vacuum cleaner system itself

BRIEF SUMMARY OF THE INVENTION

Described herein are systems for the more efficient, cleaner, and safer replacement of filter assemblies of a wet/dry vacuum appliance, as well as methods of using such systems. In accordance with a first embodiment of the present disclosure, a wet/dry vacuum appliance is described, comprising a drum; a lid assembly adapted to removably mount on or to hinge on the drum; and a filter assembly housed in the lid assembly, wherein the lid assembly comprises a removable component wherein if the removable component is removed the filter assembly is accessible to the user.

In accordance with another embodiment of the present disclosure, a filter assembly for use in association with a wet dry vacuum appliance having a removable motor assembly or blower assembly is described, wherein the filter assembly comprises a top annular region circumscribing a central opening, a handle means attached to a portion of the upper surface of the top annular region, a sealing lip extending radially outward from the outer edge of the top of the filter assembly, a filter cage, and a filter mounted to the bottom region of the filter assembly, and circumscribing the filter cage. In accordance with certain aspects of this embodiment, the sealing lip is a substantially continuous lip that circumscribes the outer edge of the top of the filter assembly. In accordance with still another aspect of this embodiment, the sealing lip may be in the form of one or more shaped and outwardly-extending tabs capable of mating with and interlocking with a mating recess formed in the inwardly extending lower lip of the bottom of the inner recess of the lid assembly.

In accordance with a further embodiment of the present disclosure, a method of removing a filter assembly of a wet/dry vacuum appliance is described, the method comprising removing a component of the lid assembly of the wet/dry appliance so as to make the filter assembly accessible to the user through the inner recess of the lid assembly; grasping a handle of the filter assembly of the wet/dry appliance; rotating the filter assembly of the wet/dry appliance so as to disengage the filter assembly from the bottom sealing surface of the inner recess of the lid assembly; and, removing the filter assembly from the wet/dry vacuum appliance by pulling the filter assembly in an upward direction so as to disengage it from the lid assembly.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a wet/dry vacuum appliance system with a removable filter assembly, wherein the vacuum appliance comprises a motor/power head or blower motor which is detachable from the lid assembly, and the lid assembly comprises a recessed region extending inwardly towards the drum of the vacuum appliance and below the power head of the vacuum, and which is formed so as to form a sealing engagement surface with a filter assembly. Further, applicants have created a method of removing a filter assembly of a wet/dry appliance having a removable component housed in the vacuum lid assembly which makes the filter assembly accessible, wherein the method includes grasping a handle of a filter assembly of the wet/dry vacuum appliance, rotating the filter assembly of the wet/dry appliance so as to disengage the filter assembly from the recessed region of the lid assembly, and removing the filter assembly from of wet/dry appliance by pulling the filter assembly in an upward direction.

Figure 1:
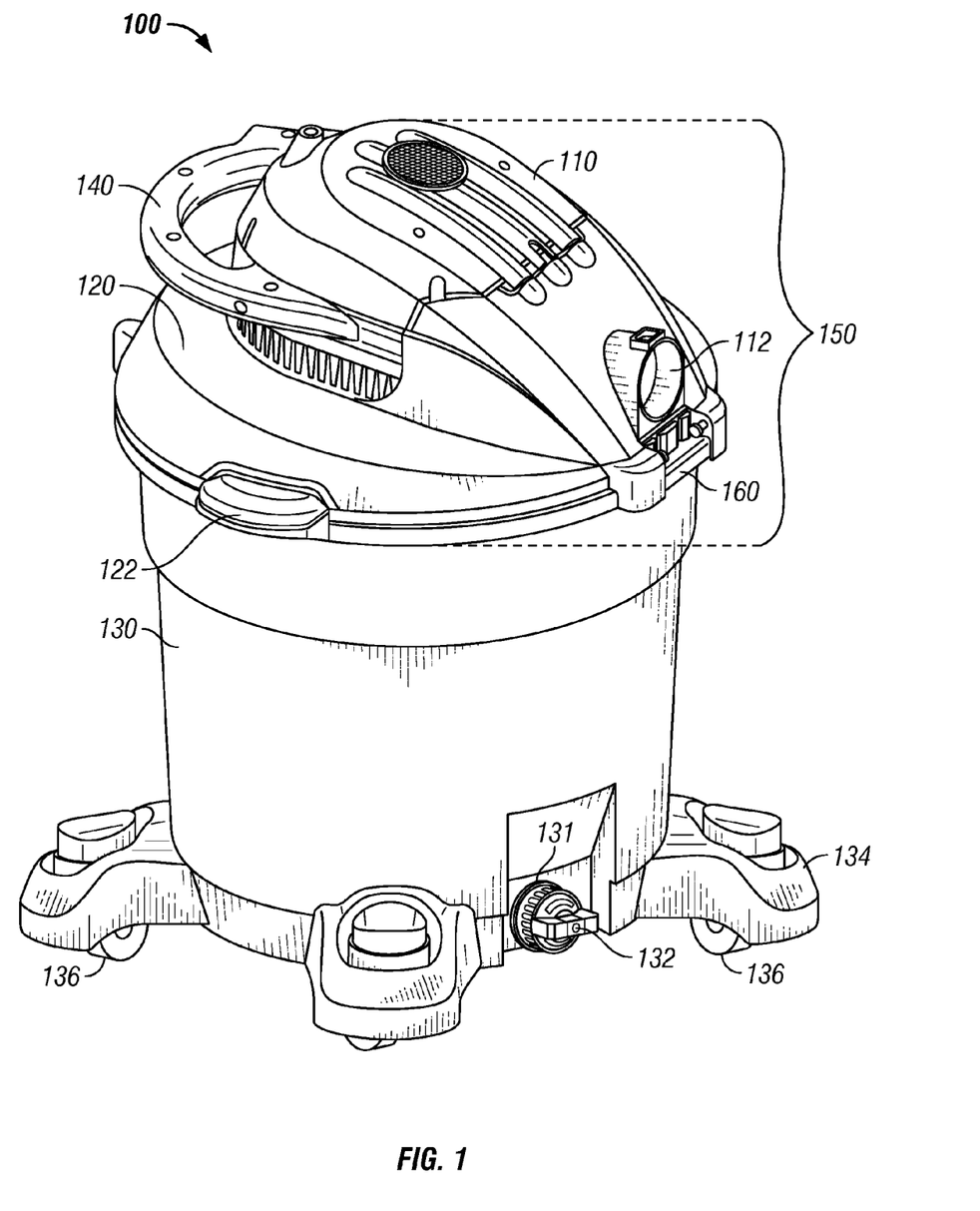
FIG. 1 illustrates a perspective view of a wet/dry vacuum according to one embodiment of the disclosed method and apparatus.

Turning now to the figures, FIG. 1 illustrates a perspective view of an exemplary wet/dry vacuum appliance 100 in accordance with the present disclosure. While the disclosure will be provided and the drawings depict, a wet/dry vacuum cleaner appliance of the type adapted to vacuum both dry debris and liquids, it is to be understood that the teachings of the disclosure can be used in conjunction with other types of vacuum cleaners and appliances wherein it is desirable to have easier access to the filter assembly in order to more rapidly and efficiently clean or change the vacuum filter. Returning to FIG. 1, a wet/dry apparatus 100, specifically a wet/dry vacuum 100, comprises a lid assembly 150 and a canister or drum 130. The lid assembly 150 and drum 130 may be connected by any mechanism, such as hinges, latches, clips, screws or bolts, to create a substantially tight connection so as to prevent debris from escaping and to allow the lid assembly 150 and drum 130 to be fully or partially detached. In the exemplary embodiment of FIG. 1, the lid assembly 150 and drum 130 may be joined together by snapping together at least one latching means 160. The lid assembly 150 typically comprises a lid 120, a removable power head 110 connected to the lid 120, and a handle means 140 connected to the power head 110 as shown, or optionally to another part of the lid 120, so as to provide a manner by which a user may lift the lid or pull the vacuum appliance 100, as desired. The lid assembly 150 may also comprise a hinging means 124 for allowing the lid to hinged upward for access to the drum 130. In accordance with certain aspects of the present disclosure, the power head 110 is detachable from the collection canister, or drum, 130 and is capable of acting as a blower as well as a motor for vacuum operation. Wet/dry vacuum appliances in which the power head is detachable from the debris collection drum are often referred to as "blower/vacs", and are exemplified by, for example, U.S. Pat. No. 5,606,769 to Tomasiak, et al, which is commonly assigned to the assignee of the present invention. The drum 130 may typically comprises one or more casters 134 and associated wheels 136 for ease of movement during operation, handles 122 for allowing a user to lift the drum 130, and optionally, in the case of larger (e.g., 8 gallon and larger) vacuum drums, a drain opening 131 that is stopped by a plug or removable, threaded cap 132, so that a user can remove the cap in order to drain accumulated liquid from within the drum, either manually such as by tipping the drum, or by way of a wet/dry vacuum pump accessory, such as that described in U.S. Design Pat. No. D551,681 S.

The wet/dry vacuum appliance 100 described herein, in particular the drum 130, the lid 120, portions of the filter assembly 200 (as will be described below), and at least a part of the motor head or blower 110 may be made from any appropriate material known to a person of ordinary skill in the art, including, but not limited to, polymers of appropriate compressive and/or impact strength, and weight; SLS (selective laser sintering) composite materials such as DuraForm XR300; plastics including propylene and acrylonitrile butadiene styrene (ABS) polymer materials; and, injection molded plastics, although other suitable rigid materials, such as aluminum and/or steel, may also be used in the construction of any or all of these parts.

Figure 2:
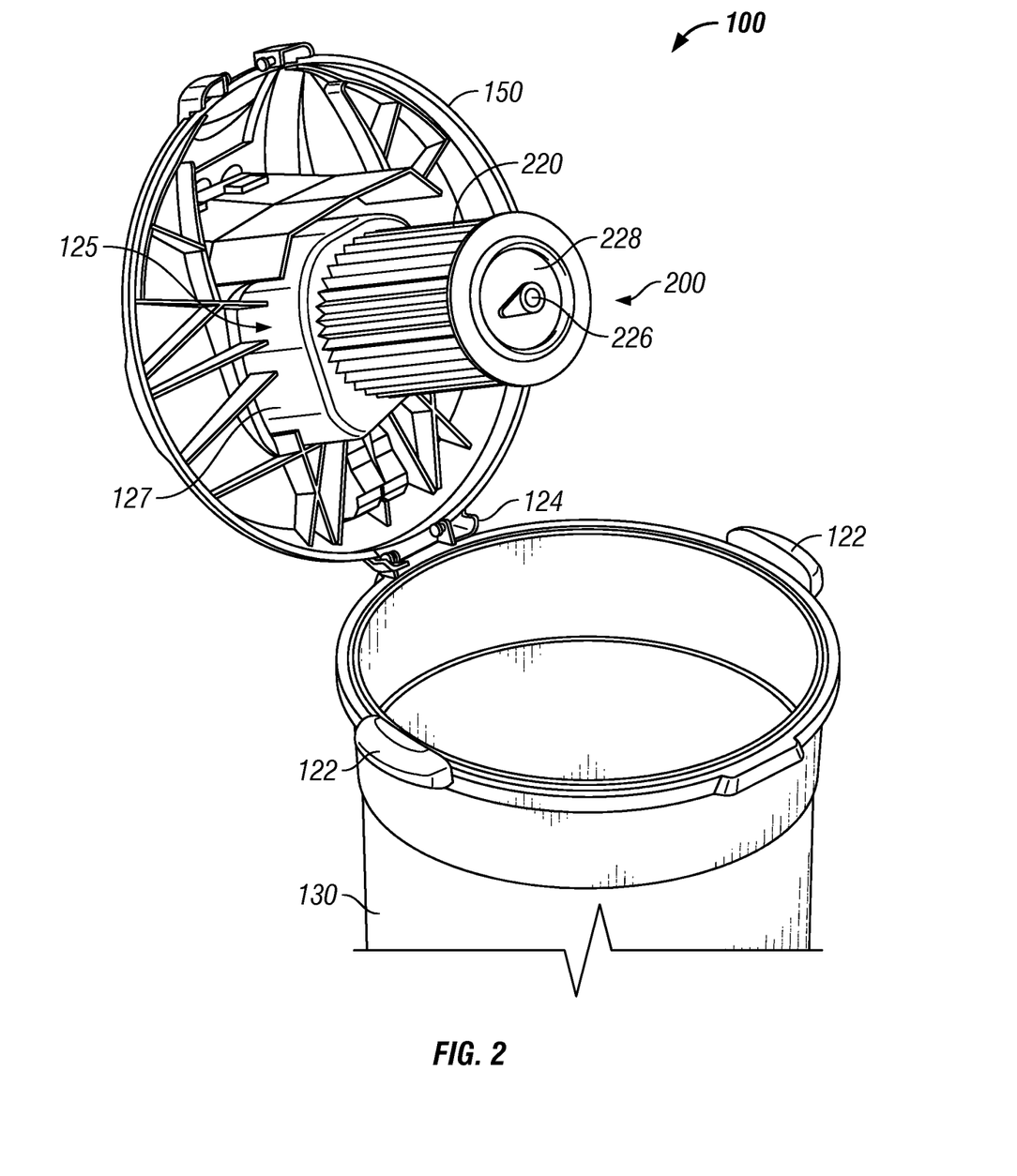
FIG. 2 illustrates a perspective view of a wet/dry vacuum with the lid unlatched according to one embodiment of the disclosed method and apparatus.
Figure 3:
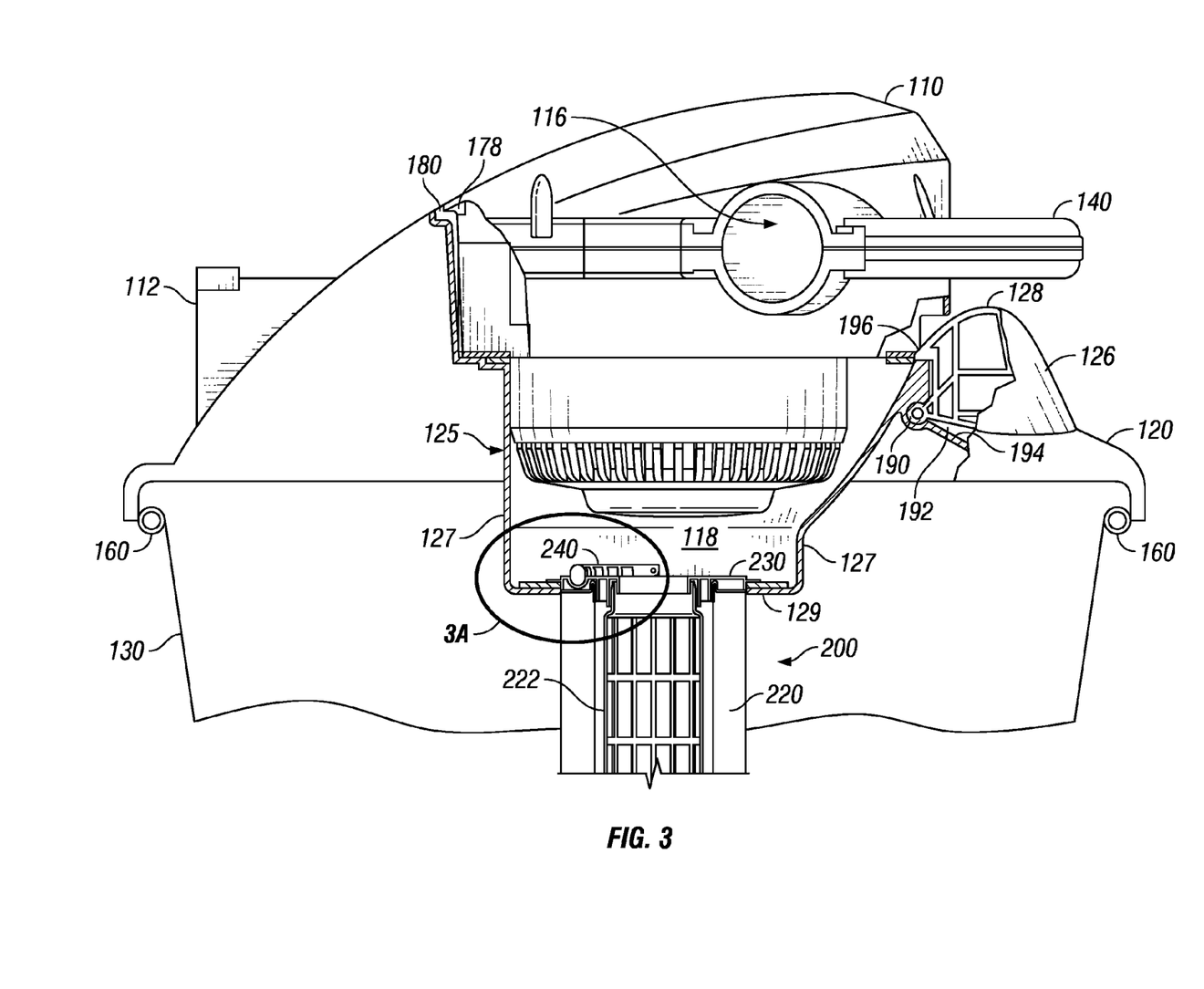
FIG. 3 illustrates a partial side-view of the vacuum appliance of FIG. 1 showing the powerhead thereof secured to the lid and the associated removable filter assembly below the powerhead.

FIG. 2 is an illustration of a perspective view of a wet/dry vacuum appliance 100 with the lid unlatched and hinged open via hinging means 124, according to one embodiment of the disclosed method and apparatus. The filter assembly 200 is shown protruding from the underside of the lid assembly 150, and comprises at least a filter 220 and a filter cage 222 (not shown), as well as a sealing engagement arrangement as will be detailed below. The filter assembly 200, similar to the vacuum appliance itself, may be made in whole or in part of polymeric materials, including but not limited to propylene and/or acrylonitrile butadiene styrene (ABS) materials, as well as different suitable conventional thermoplastic materials, particularly those suitable for plastic injection molding including but not limited to ABS-polycarbonate alloys, acetal (POM), PMMA-type acrylics, nylons, polyester liquid crystal polymers (LCP), polybutylene terepthalate (PBT polyesters), polycarbonate, polyimide, and polyphenylene oxide (PPO, such as NORYL®), by conventional means, although other suitable rigid materials may also be used. FIG. 3, as will be discussed in more detail below, illustrates a cross section perspective view of a portion of filter assembly 200 prior to removal according to one aspect of the present disclosure.

The filter 220 may be made from any suitable material that allows the filter to filter debris material through the wet/dry vacuum during operation, including, but not limited to, paper, cloth, polymeric, or high efficiency particulate air filter (HEPA) materials. Generally, the filter 220 is removably coupled around at least a portion of the cage 222, and has a lateral seal portion being oriented radially inward toward the longitudinal axis of the cage and the filter itself, the lateral seal portion at least partially extending into an undercut area formed in the mounting assembly 220 opposite the top surface 230 of the filter assembly 200, the cage 222, or a combination thereof, wherein the lateral seal portion is adapted to be compressed so as to seal the filter 220 to the underside of the to face of the filter assembly 200. The filter 220 may be held into place on the filter assembly by way of the filter cage 222 with an appropriate assembly, shown here as a filter screw or stem 226, which may run along the major axial length of the filter cage and extend outwardly from the base of the filter cage 222 and through the an orifice 227 in a filter plate 228 of the filter assembly 200. The filter 220 is secured into the filter assembly 200 by placing a filter plate 228 and filter nut 229 (see FIG. 2) onto the filter screw or stem 226. The filter cage 222 is adapted to be fixedly coupled to or near the vacuum intake portion of the air-moving system, wherein the cage has a longitudinal axis and typically comprising one or more longitudinally angled ribs disposed at an angle greater than zero degrees and less than 90 degrees to the longitudinal axis and spaced a distance from the longitudinal axis about a perimeter of the cage, or one or more perpendicularly oriented ribs as illustrated in the figures, similarly spaced a distance from the central longitudinal axis of the cage and forming an outer perimeter of the filter cage.

Other apparatuses known to those skilled in the art may be used in place of filter screw assembly shown in the figures, such as a constrictive, elastomeric sealing ring on the exterior surface of the filter plate 228, which constricts the plate 228 against the stem 226. Alternatively, a bag-like filter member sized to surround the filter cage 222 may be used and secured onto the filter cage 222 by means of a retaining band or a similar retaining means, in addition to or as a replacement to the filter. Further, barb-like protrusions (not shown) may optionally extrude from the filter assembly 200 or the filter cage 222 so as to keep such a filter bag from disengaging from the cage itself during operation.

FIG. 3 illustrates a partially cut-away cross-sectional view of the vacuum appliance 100 having a detachable power head 110, such as a blower, in accordance with aspects of the present disclosure. As shown in the figure, with the power head/blower 110 in the vacuum mode (installed in the canister lid 120), the power head 110 is secured within a interior recess 125 extending downwardly from the top portion of lid 120. A pivot mechanism comprising a pivot seat 180 and a lid pivot 178 may be included so as to provide a means for enabling power head 110 to be pivoted out from within recess 125, thereby exposing the filter assembly 200 which sits just below the lowest, bottom surface 111 of power head 110. Latch 128 within latch housing 126 releasably secures power head 110 at the back through engagement of a latching surface 196 over a latching rib 195. Latch 128 of the latching mechanism may include a journal portion 190 adapted to be received in an appropriately shaped bearing portion of socket 192. In operation, in a manner similar to the latch systems described in U.S. Pat. No. 6,055,700, pivoting of the latch 128 in socket 192 by biasing the latch releases the power head 110 as the latch 120 is pivoted such that the bottom of the latch 128 moves toward and makes contact with bottom surface 194.

FIG. 3 also illustrates the sealing relationship between the filter assembly 200 and the interior recess 125 at the bottom of the interior recess, below the lowest surface 111 of the power head 110. As illustrated therein, interior recess 125 comprises side walls 127 which generally circumscribe the entire recess, and terminate in a lower, continuous lip 129 extending inwardly toward the central axis of the vacuum appliance. Sealingly engaged with this bottom lip 129 is the top region 230 of filter assembly 200, via sealing lip 232. As may be also seen in this figure, the filter assembly 200 includes a filter 220 and filter cage 222 as described above, and may include a handle or grasping means 240 so as to aid in removal of the filter assembly from the interior of the vacuum appliance by disengaging the seal with the lower end of the recess 125. When such a handle or grasping means 240 is included, it is preferred that such an assembly is sized so as to not interfere with the operation of the power head 110 when it is installed in lid 120, e.g., it should not directly contact the lower surface 111 of power head 110.

Figure 3A:
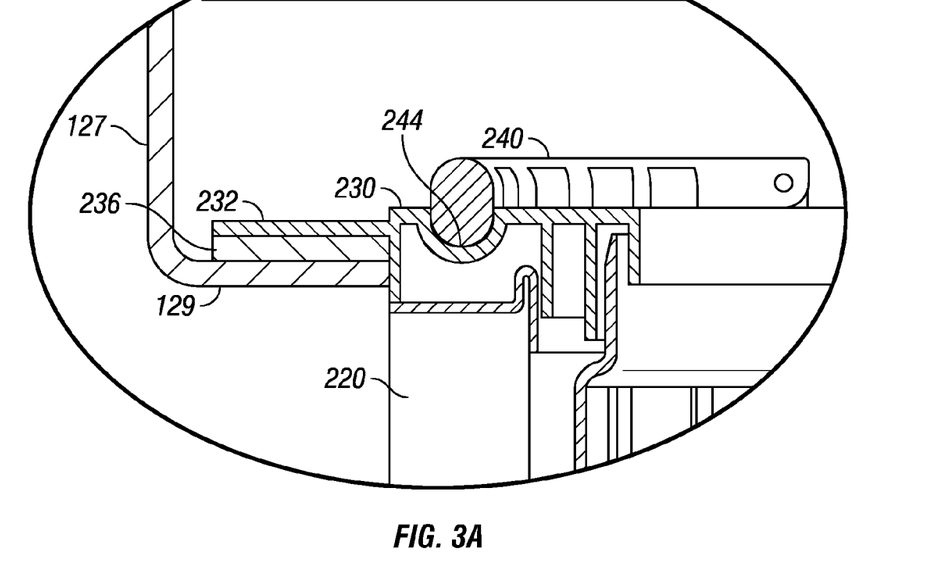
FIG. 3A illustrates an enlarged view of a portion of the side-view of FIG. 3, illustrating a sealing surface design in accordance with aspects of the present disclosure.

FIG. 3A illustrates an enlarged, detailed view of section A of FIG. 3, in order to show in more detail an exemplary manner of sealing engagement in accordance with the present disclosure. As shown therein, the filter assembly 200 has a top, substantially planar surface 230 with an optional channel for handle 240 formed therein. Circumscribing at least a portion of the surface 230 is an outwardly extending sealing lip 232 which extends on a plane a distance 'd' below the horizontal plane of top surface 230. When the filter assembly is in a sealing engagement with the lower end of interior recess 125, the sealing lip extends outwardly from the outer edge of surface 230, in the direction of recess wall 127, and over the inwardly extending, continuous lower annular lip 129 at the bottom surface of recess 125. In accordance with this aspect of the present disclosure, an sealing member 236, which may be any appropriate elastomer such as rubber or silicone, in the form of a gasket or a similar sealing means, is intermediate between the sealing lip 232 and the lower lip 129, thus forming a seal between the filter assembly 200 and the bottom region of lid 120 via the sealing assembly that includes lip 129, sealing lip 232, and sealing member or gasket 236 sandwiched intermediate there between as shown.

Figure 3B:
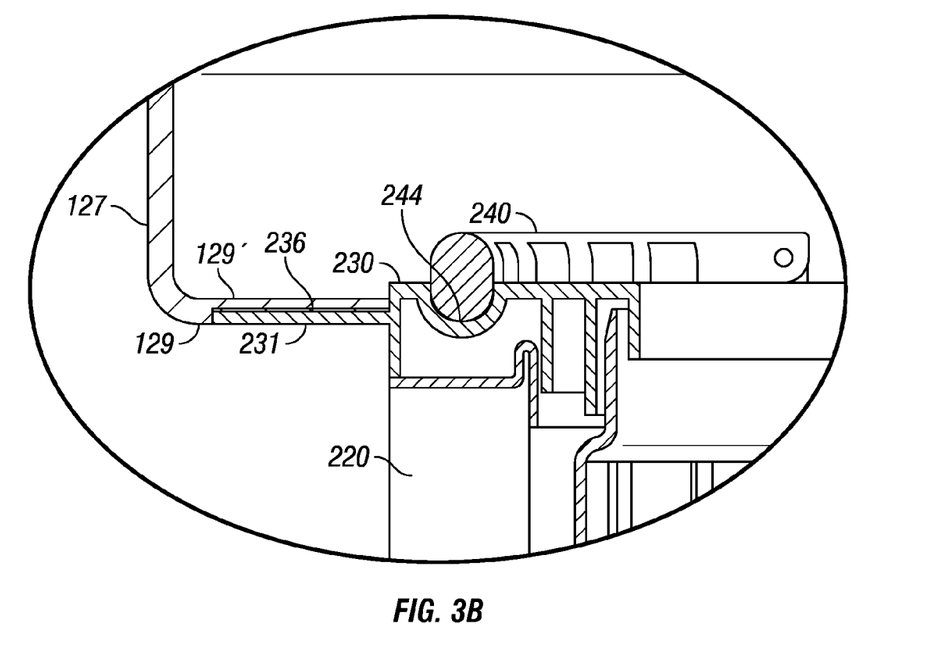
FIG. 3B illustrates an enlarged view of a portion of the side-view of FIG. 3, illustrating an alternative surface sealing design in accordance with aspects of the present disclosure.

FIG. 3B illustrates an enlarged, detailed cross-sectional view of an optional, tab-lock sealing engagement system between the filter assembly 200 and the lower region of the recess 125 of the vacuum lid 120. In accordance with this aspect of the disclosure, inwardly extending lower lip 129 of interior recess 125, includes a formed recess or slot 170 opposite the top surface 129' thereof. This recess is sized to receive a corresponding tab, or lip region 231 which extends outwardly from the top surface 230 of filter assembly 200, as shown, thereby forming a locking engagement. The slot, or recess 170 may optionally include a sealing member 236 of elastomeric material associated therewith, as described above, which when used is intermediate between the sealing lip 231 of the filter assembly 200, and the lower lip 129 of recess 125 and which acts to enhance the sealing of the system. In accordance with this aspect of the present disclosure, the at least one tab 231 that extends from, and in parallel with, the outer periphery of the top surface of the filter assembly 200 fits within a recess 170 formed in the inwardly directed lip region 129 at the bottom of the inner recess 125 of lid 120, so as to secure the filter assembly 200 to the bottom of the internal space of recess 125.

Figure 3C:
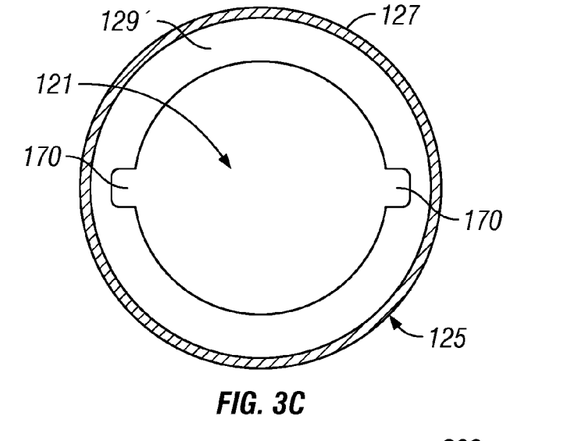
FIG. 3C illustrates a top-down view of the interior cavity region of the system of FIG. 3B, without the filter assembly 200.
Figure 3D:
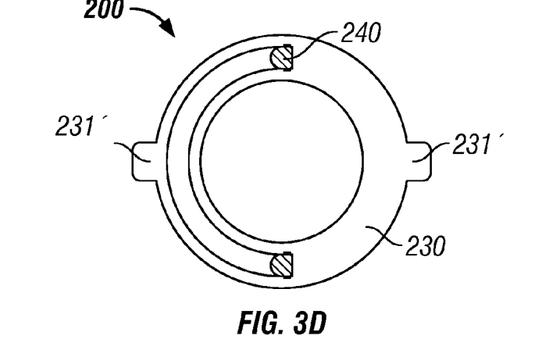
FIG. 3D illustrates a top-down view of the filter assembly 200 in accordance with the aspect of the disclosure shown in FIG. 3B.
Figure 3E:
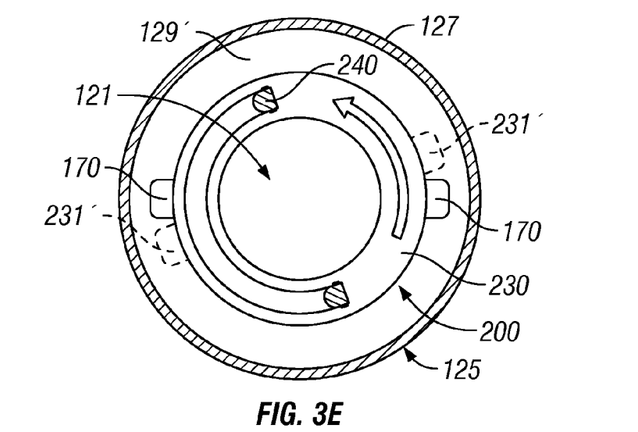
FIG. 3E illustrates a top-down view of the filter assembly of FIG. 3B, illustrating the sealing engagement of the assemblies shown in FIGS. 3C and 3D.

In FIGS. 3C-3E, there is illustrated a top-down planar view of the embodiment shown in FIG. 3B, in the respective components (3C-3D) and in cooperation with each other. FIG. 3C illustrates a top down, cross-sectional view of the lower portion of interior recess 125 of lid 120, showing side walls 127 circumscribing and defining the boundaries of the recess. The walls terminate with inwardly-extending lower lips 129 which are perpendicular to walls 127 and circumscribed the entire lower region of recess 125. As also shown therein, the outer edges of inwardly-extending lip 129 terminate at edge 166 which defines, at least in part, central opening 121 which allows air-flow communication between the tub 130 and the power head 110 during operation. One or more recesses, or slots, 170 (here, two are shown, although there may be as few as one, or more than two, as appropriate) are formed into the outer edges 166 of lip 129, extending inwardly in the direction of recess walls 127. The recesses 170 are shaped to receive the corresponding shaped tabs 231 extending from the top surface 230 of filter assembly 200. FIG. 3D illustrates a top down view of filter assembly 200, in accordance with the sealing aspect shown in FIG. 3B, wherein the top surface 230 of the filter assembly 200 includes one or more (here, two are shown) outwardly-extending tabs 231 sized to lockably engage with recesses 170 in the bottom of inner recess 125 of lid 120. Preferably, tabs 231 are also offset a slight distance below the plane of surface 230 of the filter assembly, so as to form a locking seal with the inner recess. That is, in accordance with one preferred aspect of the present disclosure, the top surface 230 of the filter assembly 200 is on a first plane and the tab (or tabs) extend from a second plane that is substantially parallel to the first plane, wherein the first plane and second plane comprise different planes.

Finally, in FIG. 3E, the coordination of filter assembly 200 with the bottom region of inner recess 125 is illustrated. As shown therein, when filter assembly 200 is inserted into the inner recess 125, such as by grasping handle 240, the assembly 200 is oriented such that the tabs 231 are aligned recesses 170 in bottom lip 129. The assembly 200 is then pressed down such that tabs 231 slide into the recesses 170, and the assembly 200 is then turned/rotated a distance (e.g., 25°, 35°, 45° or 90°), such that tab 231 is locked into position by being below at least a portion of lip 129.

Figure 4:
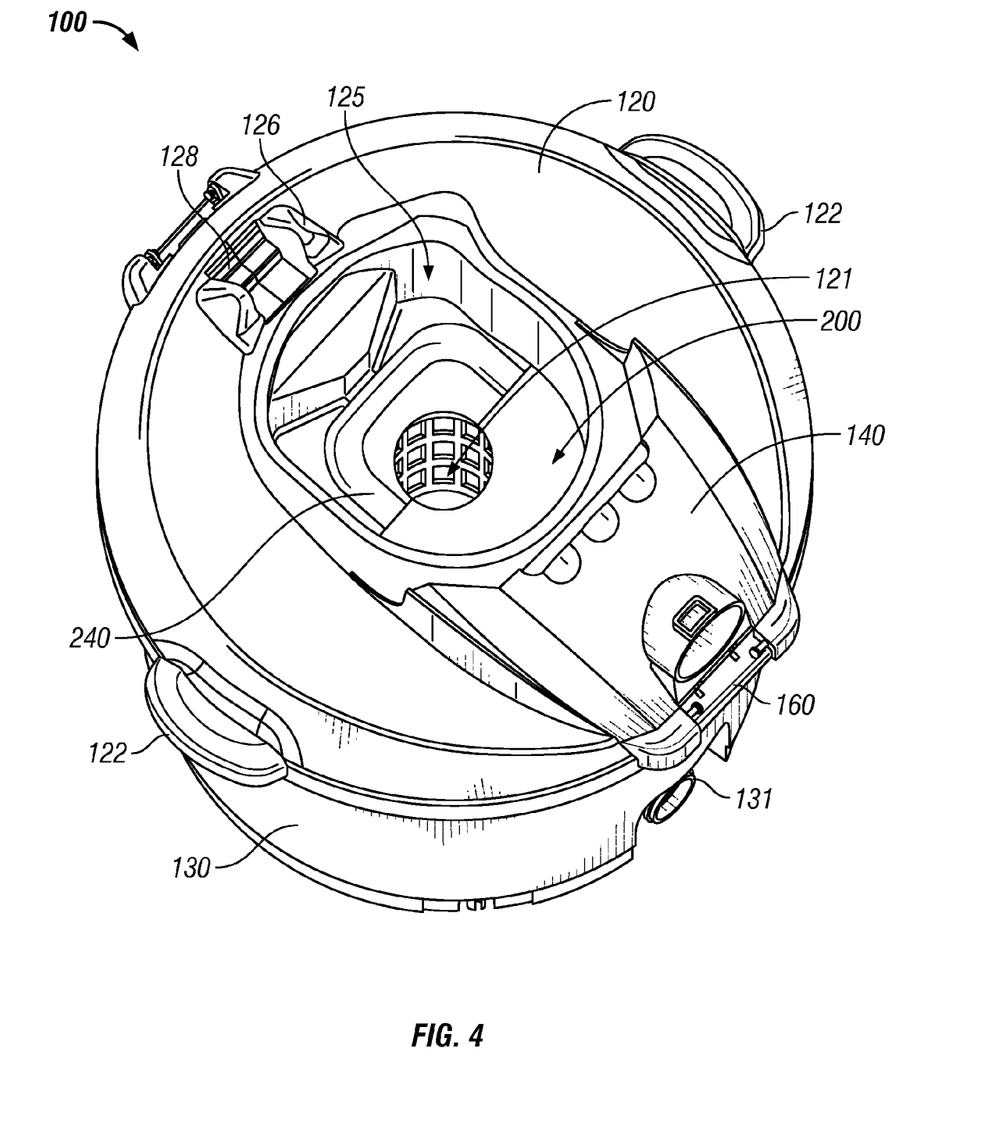
FIG. 4 illustrates a top perspective view of the wet/dry vacuum appliance of FIG. 1 with the power head removed for purpose of clarity.
Figure 6:
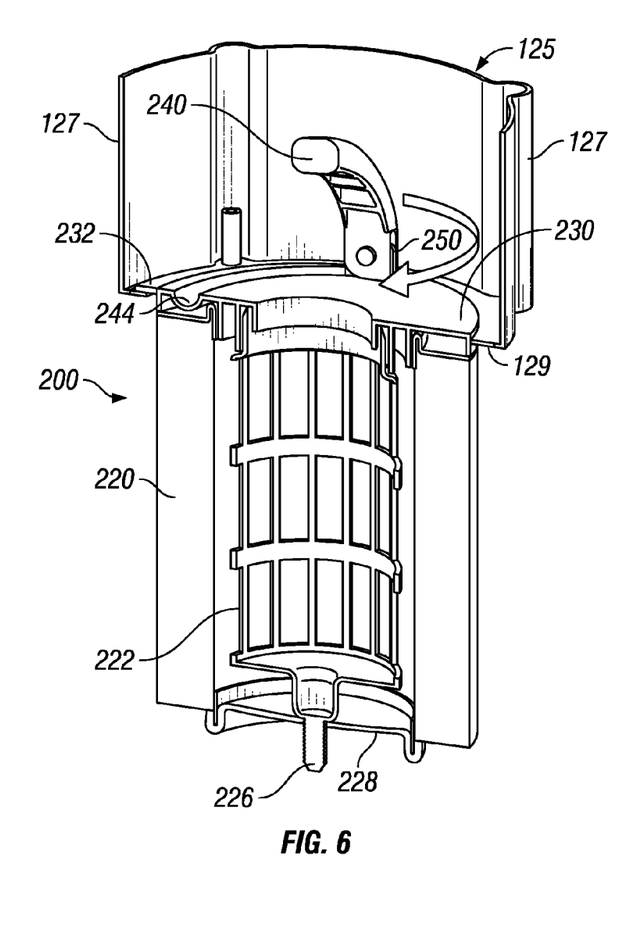
FIG. 6 illustrates a cross section perspective view of a filter assembly prior to removal with the filter assembly handle rotated upward in accordance with one aspect of the disclosed method and apparatus.

Turning to FIG. 4, shown therein is a perspective view of a wet/dry vacuum appliance 100 with the detachable power head 110 removed, and not shown (for purpose of clarity), according to one embodiment of the disclosed method and apparatus. With the detachable power head 110 removed, the filter assembly 200 and filter assembly handle 240 are visible within interior recess 125 of lid 120 from the top. The filter assembly handle 240 is shown in its down position, within handle channel 244. While the filter assembly handle 240 is shown as a semi-circular assembly, it should be recognized that any shape which would allow a human hand to hold the handle would be acceptable. For example, the filter assembly handle 240 may be a triangular shape or a round shape with a flat gripping handle. Further, the filter assembly handle 240 may include additional gripping means to create a better grip for the user, for example, without limitation, a rubber handle or rough surface. In addition to have different shapes, the filter assembly handle 240 may be stored or attached to the filter assembly in a many ways. For example, instead of rotating the filter assembly handle 240 up a number of degrees, such as ninety degrees, as is shown in FIG. 6 below, the filter assembly handle 240 could be a flexible strap, such as a leather, material, or polymer strap, that a user would place his hand and lift to remove the filter assembly 200. Alternatively, the filter assembly handle 240 handle could be raised straight up out of the filter assembly 200 instead of being rotating some degree, e.g., ninety degrees, and then pulling the filter assembly 200 out of the wet/dry appliance.

Figure 5:
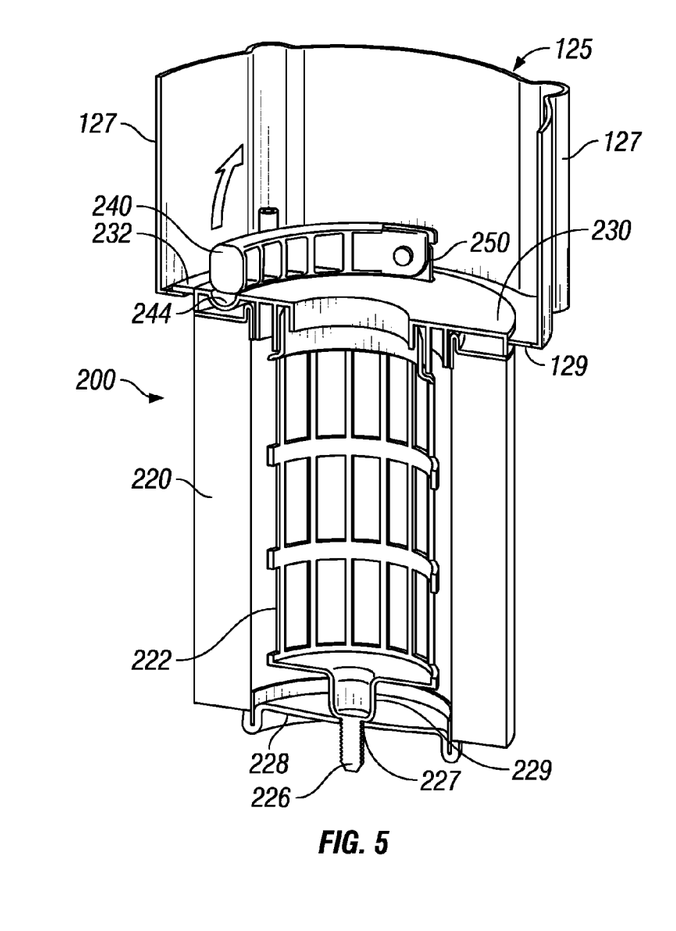
FIG. 5 illustrates a cross sectional perspective view of a filter assembly prior to removal according to one aspect of the disclosed method and apparatus.

Turning now to FIGS. 5-8, these figures illustrate the removal of filter assembly 200 from the interior cavity region 125 of lid 120, following the removal or disengagement of the vacuum power head or blower motor assembly 110. FIG. 5 is an illustration of a cross section perspective view of a filter assembly 200 prior to removal from the wet/dry vacuum appliance 100 according to one aspect of the disclosed method and apparatus. The filter assembly 200 comprises a sealing surface as described in FIG. 3A or 3B, above, adapted to form substantially tight seal between the wet/dry appliance and the filter assembly, a filter cage 222 adapted to house a filter 220 and a filter assembly handle 240 adapted to remove the removable filter assembly 200, such as by human hand. The filter assembly 200 as shown would be in a filter working position and would allow the wet/dry vacuum to operate and perform in its standard vacuuming or blowing function. The filter assembly handle 240 is shown in its down position, partially retained within channel 244 formed into the top surface 230 of filter assembly 200. In the down position, the filter assembly handle 240 may also be used to as a camming means in order to pull the filter assembly 200 down tight against the inwardly extending bottom lip 129 of lid 120 so as to establish a vacuum-tight seal. As is shown, the filter cage 222 may be used to provide optional interior support for the filter 220 which circumscribes cage 222, and includes filter stem neck 224, filter stem 226, and optionally a stem nut as described above so as to retain the filter on the filter cage when the vacuum is not in operation by way of filter cap plate 228.

As discussed above, the sealing surface formed between the lid assembly 150 and the filter assembly 200 performs the function of creating a substantially tight connection or seal between the lid assembly 150 and the filter assembly 200 so as to keep debris from escaping, yet simultaneously allowing vacuum air flow through central opening 121 in the filter assembly. The sealing surface 400, as described in detail above, may be made from any material known to a person of ordinary skill in the art, such as a closed seal foam with an adhesive back, or an elastomer such as rubber or any similar elastomeric material which would allow the filter assembly to rotate without causing the sealing surface to tear and which is still capable of generating a tight seal during operation of the vacuum appliance 100.

FIG. 5 is an illustration of a cross section perspective view of a filter assembly prior to removal with the filter assembly handle rotated according to one embodiment of the disclosed method and apparatus. The filter assembly handle 240 is shown rotated upward via a hinge assembly 250, which may comprise a hinge pin 252 or the equivalent, into the upward position, which allows a user to directly access the filter assembly handle 240. In the up position, the filter assembly handle 300 can be used to grab hold of, twist and remove of the filter assembly 200, or to twist lock the filter assembly 200 into the lid assembly 150 for a tight locking fit and seal, such as shown in FIG. 3B-3E. This twist-lock action can be used in place of or in addition to other techniques, such as the cam technique described in FIG. 5.

Figure 7:
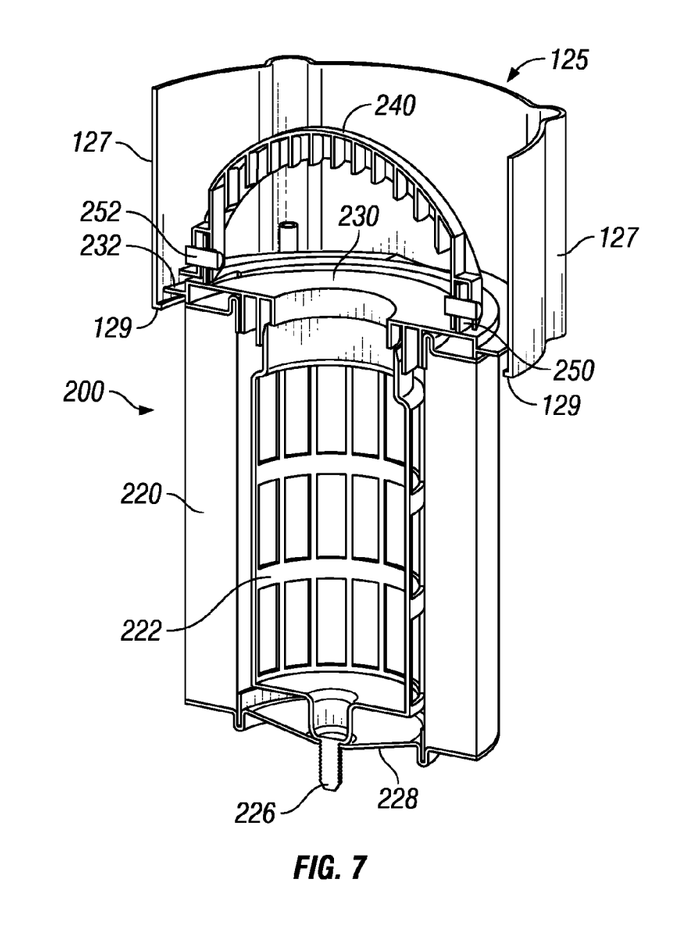
FIG. 7 illustrates a cross section perspective view of the filter assembly of FIG. 6. rotated 90°, prior to removal according to one aspect of presently disclosed method and apparatus.

Turning now to FIG. 7 and the next stage of a method of operating the filter assembly of the present disclosure, this figure illustrates a cross sectional perspective view of the filter assembly 200 of FIG. 6 rotated about 90° prior to filter assembly removal according to one embodiment of the present disclosure. The filter assembly handle 240 is shown in the up and rotated position, which allows the user to either rotate and lock in the filter assembly 200 into lockable engagement with interior lid region 125, or pull the filter assembly up and out, as is shown in FIG. 8, so as to remove the filter assembly 200 from the lid assembly 120.

Figure 8:
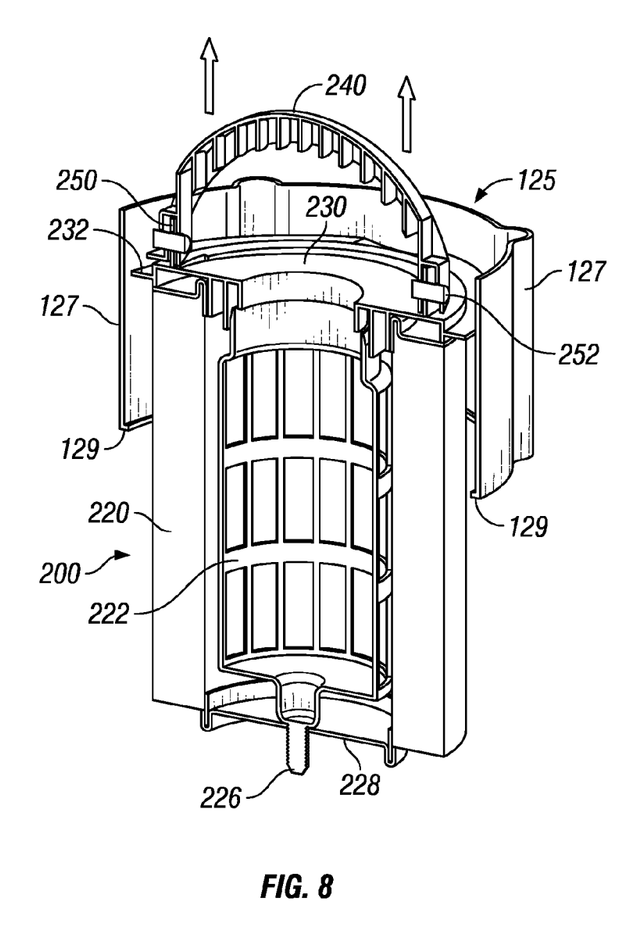
FIG. 8 illustrates a cross section perspective view of the rotated filter assembly of FIG. 7 during removal according to one aspect of the disclosed method and apparatus.

FIG. 8 is an illustration of a cross section perspective view of the rotated filter assembly 200 from FIG. 7 during filter assembly removal, according to one embodiment of the presently disclosed method. FIG. 8 illustrates how a user may remove the filter assembly 200 from the interior region 125 of lid assembly 150 and thus the wet/dry vacuum cleaner 100 after the user has rotated the filter assembly handle 240 to the up position and rotated the filter assembly 200 about 90° so as to disengage it from its sealing engagement with the bottom of the interior 125. Once the filter assembly 200 has been removed, the user may then choose to clean or replace the filter 220 itself, as appropriate. After cleaning or replacing the filter 220, the user could replace the filter assembly 200 within interior region 125 of lid assembly 120, and re-engage the filter assembly in a sealed relationship with bottom lip 129 without ever having to remove the relatively bulky lid assembly 150 itself. To do so, the user would replace the filter assembly 200 into the bottom of the interior region 125 of the lid assembly 150, and then rotate the filter assembly 200 in an appropriate manner so as to lock or secure the filter assembly 200 into place against the inwardly-extending bottom lip 129 of interior region 125 in a manner consistent with assemblies described herein (e.g., in the manner associated with the assemblies of FIG. 3A or FIG. 3B), and then rotate the filter assembly handle 240 back down into its storage position, such as within channel 244.

Other and further embodiments utilizing one or more aspects of the inventions described above can be devised without departing from the spirit of Applicant's invention. For example, while not as desirable, an easy access filter assembly and/or method may be created by removing the entire power head instead of just the removable blower in the case where the wet/dry vacuum does not have a removable blower. Further, the various methods and embodiments of the easy access filter assembly can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A wet/dry vacuum appliance comprising:
   a drum having a top opening;
   a lid assembly adapted to removably mount on or to hinge on top of the drum to cover the top opening; and a filter assembly housed within the lid assembly;
   wherein the lid assembly comprises a recess with a removable component housed therein and a lid, wherein the filter assembly is removable through the recess when the lid is fully attached to the drum to cover the top opening and the removable component is removed from the lid assembly.

2. The wet/dry appliance of claim 1, wherein the removable component is a detachable blower.

3. The wet/dry appliance of claim 1, wherein the removable component is a power head.

4. A method of removing a filter assembly of a wet/dry appliance comprising a drum having a top opening and a lid assembly adapted to cover the top opening, wherein the lid assembly comprises a lid and a recess with a removable component housed therein, the method comprising the steps of:

removing the component of the lid assembly of the wet/dry appliance making the filter assembly accessible;

grasping the handle of a filter assembly of the wet/dry appliance;

rotating the filter assembly of the wet/dry appliance; and     removing the filter assembly from the wet/dry appliance through the recess when the lid is fully attached to the drum to cover the top opening.

5. The method of claim 4, wherein the component of the lid assembly is a detachable blower.

6. The method of claim 4, wherein the component of the lid assembly is a power head.

7. The method of claim 4, wherein the wet/dry appliance is a wet/dry vacuum.

8. The method of claim 4, further comprising removing a filter from the filter assembly.

9. The method of claim 5, further comprising cleaning or replacing the filter.

10. The wet/dry appliance of claim 1, wherein the filter assembly comprises:
    a filter;
    a filter cage; and
    a handle hingably connected to a top surface of the filter cage and adapted to remove the removable filter assembly.

11. The wet/dry appliance of claim 10, wherein the removable filter assembly further comprises a sealing surface adapted to form substantially tight seal between the wet/dry appliance and the filter assembly.

12. The wet/dry appliance of claim 10, wherein the removable filter assembly further comprises a locking mechanism adapted to secure the filter in the filter assembly.

13. The wet/dry appliance of claim 10, wherein the handle is adapted to position the filter assembly to be secured into place.

14. The wet/dry appliance of claim 1, wherein the filter assembly comprises a filter and a filter frame.

\* \* \* \* \*